April 1, 1969    P. H. SMITH    3,436,506
ELECTRONIC HEATING APPARATUS
Filed April 11, 1966
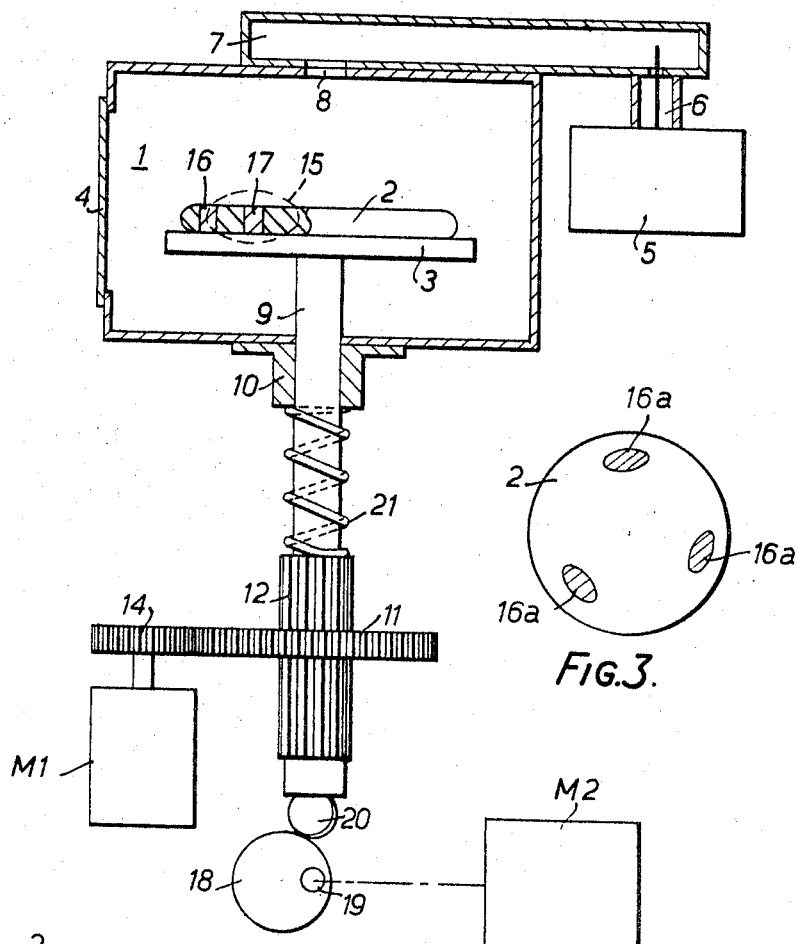
FIG.3.
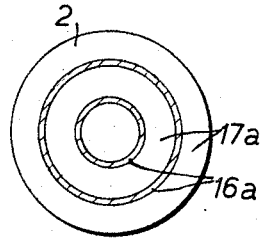
FIG.2.
FIG.1.
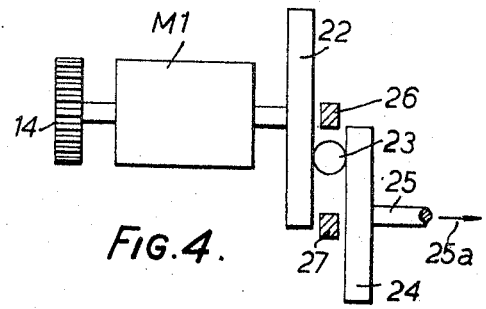
FIG.4.

United States Patent Office 3,436,506
Patented Apr. 1, 1969

3,436,506
ELECTRONIC HEATING APPARATUS
Peter Harold Smith, "Jangada," The Avenue, Maidenhead, Berkshire, England, assignor to Microtherm Limited, London, England, a corporation of England
Filed Apr. 11, 1966, Ser. No. 541,577
Claims priority, application Great Britain, Apr. 8, 1965, 14,913/65
Int. Cl. H05b 9/06
U.S. Cl. 219—10.55                    11 Claims

ABSTRACT OF THE DISCLOSURE

This disclosure relates to a microwave oven having a metallic heating chamber and a rotatable platform upon which a food article is supported. The platform is simultaneously rotated and reciprocated while the food article is being heated. The frequencies of rotation and reciprocation bear no simple relationship to each other.

---

My invention relates to electronic heating apparatus, such as microwave ovens, which are powered by electromagnetic radiations derived electronically.

The energy field set up within the heating or cooking chambers of such devices will be, in general, non-uniform, although many attempts have been made to improve this situation, which leads to the uneven heating of articles. Non-uniformities arise whether the chamber be large or small, corresponding to many or only one mode of propagation being possible therein.

The consequent existence of hot and cold spots within the chambers is especially disadvantageous in cookers, since foodstuffs are nearly always poor heat conductors and comestibles which are overcooked in some portions and raw in others are usually quite unplatable.

The electronic heating or cooking of objects turning on a turntable within the chamber sometimes brings about their more even heating, but even so, concentric rings of under- and over-heating often result.

The broad object of the invention is to enable objects to be heated more evenly by electronic power.

It is a specific object of the invention to provide an improved form of microwave oven for heating foodstuffs.

It is a further object of the invention to provide a microwave oven capable of producing uniform heating throughout the bulk of an extended mass of foodstuff placed therein.

Features and advantages of the invention will become apparent from the following description of an embodiment thereof, given by way of example only, in conjunction with the accompanying drawings, in which:

FIGURE 1 shows in section a microwave oven and its power source together with a flat article of food supported on a turntable within the cooking chamber;

FIGURE 2 shows such a food article when unsatisfactorily cooked;

FIGURE 3 shows a similar comestible also unevenly cooked; and

FIGURE 4 shows a detail of a variation in the arrangements of FIGURE 1.

Referring to FIGURE 1, there is shown in a microwace cooker installation a cooking chamber 1 in which a disc-shaped article of food 2 has been placed on a rotatable platform 3 using an access door consisting of a thin steel sheet 4 backed at intervals around its periphery by coil springs (not shown), to ensure repeatable good, microwave-tight closures.

The coker is powered by a magnetron oscillator source 5 which may have fins and be located in a current of air from a fan or the like to keep it cool. A coaxial line 6 couples wave energy to a rectangular waveguide 7 run integral with chamber 1, whence it passes through a coupling iris 8 into the chamber. The platform 3 is supported on a shaft 9 which passes through a hole in the bottom of the chamber and through a brass bearing 10 to engage a gear wheel 11 by means of splines such as 12 on a thicker portion 13 which passes through the gear wheel.

This spline engagement allows the shaft to remain in driving engagement with the gear wheel 11 while moving up and down for reasons set forth below.

The shaft 9 and platform 3 are made of a dielectric material which will absorb negligible microwave power, both not to waste the latter and not to perturb the field. The thickness of the shaft must not exceed that value which, taking into account the length of the tunnel provided by bearing 10, will prevent the escape of appreciable significant power through the aperture. The aperture and the bearing form a waveguide, with the shaft material as dielectric, in which the electromagnetic energy forms an evanescent mode. The further below "cut off" is the diameter of the aperture, the less need be the length of the bearing 10, from the electrical point of view.

Gear wheel 11 meshes with a primary gear wheel 14 which is shaft driven by a motor M1, so that the food article 2 is rotatable by motor M1, which can be of a constant speed type.

The arrangement as so far described enables article 2 to rotate in its own plane within the radio-frequency heating field in chamber 1 to absorb power therefrom.

Unfortunately, the radio-frequency field usually includes nodes and antinodes, sometimes very sharply defined, at very best the field varies considerably in intensity over the area of the food article.

It is assumed that the heating chamber is large enough for many antinodes to be formed, of which one is shown at 15. The elliptical outline defines a zone of maximum electric field, at the centre of which there may well be an area of minimum power. It is assumed for ease of explanation that the node pattern is simple. In practice neither of these assumptions may be strictly correct, but the advantages of the arrangements to be described below for counteracting the uneven field distribution have been found to be realised for many geometrically distinct types of heating chamber.

As will be seen from FIGURE 1, a part 16 of the food article will pass through the antinode of maximum power plot 15 once per revolution, while a part 17 of the article will pass through the nodal minimum at the centre of antinode 15 (which need not be oval but often is), also once per revolution.

The part 16 of the food article, then, and all other parts at the same radius from the centre of rotation, will tend to be over-cooked while parts such as 17 will tend to be under-cooked.

The degree of uneven cooking will certainly be reduced by the fact that the food rotates, rather than stands still, but even so, the cooked article tends to exhibit the "bulls-eye" aspect shown in FIGURE 2, there being concentric regions 16a of over-cooking separated by like regions 17a of under-cooking. Food presented in this manner is usually unacceptable.

Accordingly, an arrangement is provided for moving the turntable vertically with reciprocative motion while rotation takes place.

As a result the part 16 of the article does not always pass through the antinodal heating region at each revolution, and the part 17 does not always pass through the minimum at the centre of antinode 15. In fact, if the turntable 3 is raised slightly, part 17 will clearly pass through antinode 15, that is, through a maximum of the heating effect, instead of through a minimum.

Thus the degree of heating for each portion is equalised, or at least the deviation is drastically reduced. If the geometry of the oven were such that the electric lines of force were predominantly vertical, the advantage to be obtained from the up and down turntable displacement may be greatly reduced, but this condition is seldom encountered in practice.

The arrangement for vertical reciprocation of comestible 2 conveniently comprises a driving member 18 rotatable eccentrically about a shaft axis 19 by a second motor M2 and bearing against bias from a spring 21 on the cupped lower end of shaft 9 through a friction reducing ball 20.

Motors M1 and M2 and any gears used are arranged such that shaft 9 rotates and reciprocates at frequencies which bear no simple relation with each other. In this way a part of the foodstuff such as 17 having once passed through a nodal field point such as illustrated will not pass through that particular mode again for a considerable period.

Any other method of causing reciprocative motion of shaft 9 while it rotates can be used, and it is very desirable that unrelated frequencies of reciprocation and rotation be used to avoid food items being heated or cooked after the manner illustrated in FIGURE 3.

FIGURE 3 shows a disc-shaped comestible 2, such as a bun or the like having three equispaced over-cooked regions 16a (shown dark) on the same circle. This defect could be caused by reciprocation at three times the rate of the rotation, so that those three regions repeatedly passed through the same antinode of maximum electric field intensity.

An arrangement is shown in FIGURE 4 by which two repetitive movements of independent or unrelated repetition rates may be derived from a single motor such as M1 in order to avoid the requirements for a second motor M2.

Motor M1 has, in addition to a shaft driving gear wheel 14 a second direct shaft drive to a driving disc 22 shown edge-on in FIGURE 4. Resiliently biased towards disc 22, but prevented from touching it by a ball 23, is an opposed driven disc 24 on a shaft 25 disposed parallel to but not concentric with the shaft on which driving disc 22 is mounted.

Ball 23 is confined by suitable guide means not shown to move in the plane of FIGURE 4 its movement in this plane being limited by two stops designated 26, 27. The ball will take up a random and continuously varying position between the two stops. The rate at which driven shaft 25 rotates, which is determined by the position of ball 23, thus bears a random relationship with the rate of rotation disc 22 and motor M1, and that relationship will vary from one instant to another instant. If preferred, means may be provided whereby the ball 23 deliberately moved between its limits, to provide a selected continuous variation of speed of shaft 25. This avoids any tendency for the ball to become static in any one position between the stops.

Shaft 25 may be connected to shaft 19 (in FIGURE 1) and thus control and reciprocation rate of turntable 3 to vary in a random manner with the rotation rate.

Not only is the presence of a second motor avoided, but no calculations need now be made to ensure non-synchronized movements. Speeds of reciprocation of the order of 20 cycles per minute are found to be suitable.

The arrangements described reduce the tolerances needed in the design of cooking chambers in electronic ovens, since the standards of uniformity in the energising fields can be relaxed. High degrees of uniformity are very difficult technically to achieve in practice.

I claim:

1. Electronic heating appartus comprising in combination a closable metallic chamber, means operable to produce chamber for supporting a substance to be heated, a vertically disposed shaft supporting said platform, bearing means supporting said shaft for rotational and reciprocatory motion, first drive means operable to produce rotational movement of said shaft at a first predetermined frequency, and second drive means operable to produce axial reciprocatory movement of said shaft at a second predetermined frequency, whereby each part of said substance traces a helical path through said field, said first and second frequencies bearing no simple relationship with each other, to prevent each part of said substance from retracing the same helical path through said field for at least several revolutions of said first drive means.

2. The invention as claimed in claim 1 wherein said first drive means comprises a gear wheel supported for rotation coaxially with said shaft; electric motor means coupled to produce rotation of said gear wheel and spline means coupling said gear wheel and said shaft for simultaneous rotation while permitting relative axial movement thereof.

3. The invention as claimed in claim 2 wherein said second drive means includes a camshaft mounted for rotation; electric motor means operable to produce rotation of said camshaft; cam means on said carshaft; and means coupling said cam with said support shaft whereby rotation of said camshaft by said motor means produces axial reciprocatory movement of said support shaft.

4. The invention as claimed in claim 3 wherein said first and second drive means include a single electric motor and drive means coupling said motor to drive both said gear wheel and said camshaft.

5. The invention as claimed in claim 4 wherein the means coupling said motor to drive said camshaft includes frictional drive means of variable speed ratio.

6. The invention as claimed in claim 5 wherein said frictional drive means comprises: a first disc mounted for rotation about its axis; a second disc mounted for rotation about its axis, said disc axes being parallel but not coincident; means drivingly coupling one said disc for rotation by said motor; means driving coupling said second disc to rotate said camshaft; and ball means engaging both said discs to produce frictional coupling therebetween.

7. The invention as claimed in claim 6 wherein said ball means comprises a ball guided for unrestrained but limited movement along a common radius of said discs.

8. Apparatus according to claim 1, wherein said first and second drive means comprise first and second motors, one of said motors being operated at a speed which is a non-integral multiple of the speed of operation of the other motor.

9. Apparatus according to claim 1, wherein said shaft is composed of dielectric material and said bearing is a hollow metallic member surrounding said shaft and having an end in electrical contact with said chamber, whereby the escape of appreciable microwave power through said shaft is prevented.

10. The invention as claimed in claim 1 wherein said shaft is formed of insulating material and wherein said bearing means includes metal tube means of predetermined length closely surrounding said shaft, said tube having a ratio of length to diameter so related to the frequency of said electromagnetic field as substantially to prevent the escape of said energy from said chamber by way of said shaft.

11. The invention as claimed in claim 1 wherein said first drive means comprises the combination of: a gear wheel supported for rotation coaxially with said shaft and spline means coupling said gear wheel and said shaft for simultaneous rotation while permitting relative axial movement thereof; said second drive means comprises a camshaft mounted for rotation; cam means on said camshaft; and means coupling said cam with said support shaft whereby rotation of said camshaft produces axial reciprocatory movement of said support shaft; together with electric motor means; drive means of predetermined speed ratio means coupling said electric motor with said gear wheel to produce rotation thereof and further means drivingly coupling said electric motor to said camshaft; said further drive means having a speed ratio incommensurate with said predetermined ratio.

References Cited

Milkrowellen: German application 1,066,679, printed Oct. 8, 1959.

RICHARD M. WOOD, *Primary Examiner.*

L. H. BENDER, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,436,506                                                   April 1, 1969

Peter Harold Smith

It is certified that error appears in the above identified patent and that said Letters Patent are hereby corrected as shown below:

Column 1, line 38, "unplatable" should read -- unpalatable --; line 64, "wace" should read -- wave --; line 71, "coker" should read -- cooker -- Column 3, line 74, after "pro-" insert -- duce a microwave electromagnetic field within said chamber, a platform within said --. Column 4, line 23, "carshaft" should read -- camshaft --.

Signed and sealed this 7th day of April 1970.

(SEAL)
Attest:

Edward M. Fletcher, Jr.                                 WILLIAM E. SCHUYLER, JR.
Attesting Officer                                               Commissioner of Patents